US010643809B2

(12) United States Patent
Romanet-Perroux et al.

(10) Patent No.: US 10,643,809 B2
(45) Date of Patent: May 5, 2020

(54) MEDIUM-VOLTAGE ELECTRIC DISTRIBUTION CUBICLE

(75) Inventors: Philippe Romanet-Perroux, Biviers (FR); Bertrand Cabaret, Genoble (FR); Albin Henon, Claix (FR); Jean-Pierre Nereau, Seyssinet (FR)

(73) Assignee: SCHNEIDER ELECTRIC INDUSTRIES SAS (FR)

( * ) Notice: Subject to any disclaimer, the term of this patent is extended or adjusted under 35 U.S.C. 154(b) by 229 days.

(21) Appl. No.: 12/998,770

(22) PCT Filed: Nov. 30, 2009

(86) PCT No.: PCT/FR2009/001355

§ 371 (c)(1), (2), (4) Date: May 31, 2011

(87) PCT Pub. No.: WO2010/076401

PCT Pub. Date: Jul. 8, 2010

(65) Prior Publication Data

US 2011/0232959 A1 Sep. 29, 2011

(30) Foreign Application Priority Data

Dec. 18, 2008 (FR) ..................................... 08 07108

(51) Int. Cl.

| | |
|---|---|
| ***H01H 33/666*** | (2006.01) |
| ***H01H 31/00*** | (2006.01) |
| ***H01H 31/10*** | (2006.01) |
| ***H01H 3/30*** | (2006.01) |

(52) U.S. Cl.

CPC ...... *H01H 33/6661* (2013.01); *H01H 31/003* (2013.01); *H01H 3/3047* (2013.01); *H01H 31/10* (2013.01)

(58) Field of Classification Search

CPC ...... H01R 11/05; H01R 13/514; H01R 13/64; H01R 25/14; H01R 9/2675; H01R 2105/00; H01R 2201/20

USPC .............................. 307/112, 125; 174/6, 520

See application file for complete search history.

(56) References Cited

U.S. PATENT DOCUMENTS

| | | | | |
|---|---|---|---|---|
| 5,206,616 | A * | 4/1993 | Stegmuller .................. | 335/126 |
| 2003/0107853 | A1* | 6/2003 | Marchand et al. ............ | 361/42 |

FOREIGN PATENT DOCUMENTS

| | | |
|---|---|---|
| DE | 35 28 770 | 2/1987 |
| DE | 10 2005 013 231 | 9/2006 |
| EP | 1 302 959 | 4/2003 |
| GB | 2 380 859 | 4/2003 |

* cited by examiner

*Primary Examiner* — Carlos Amaya

(74) *Attorney, Agent, or Firm* — Steptoe & Johnson LLP

(57) ABSTRACT

A medium-voltage electric distribution cubicle for fitting between two parts of an electric circuit to cause current flow, current interruption, circuit disconnection, and grounding. This cubicle includes a vacuum break circuit breaker-disconnector or vacuum break switch-disconnector connected in series with a selector switch having at least two positions, namely, a current flow position and a grounding position.

5 Claims, 4 Drawing Sheets

MEDIUM-VOLTAGE ELECTRIC DISTRIBUTION CUBICLE

CROSS-REFERENCE TO RELATED APPLICATIONS

This application is a U.S. National Stage of PCT/FR2009/0011355, filed Nov. 30, 2009, and claims priority of French Application No. 08 07108, filed Dec. 18, 2008.

BACKGROUND OF THE INVENTION

The present invention relates to a medium-voltage electric distribution cubicle designed to be fitted between two parts of an electric circuit so as to perform at least the functions respectively of current flow between the parts, of current interruption between the parts, of circuit disconnection, and of earthing of one of the above-mentioned parts.

In known electric distribution cubicles, vacuum cartridges are used to perform the switch and circuit breaker functions whereas air- or gas-insulation devices are used to perform the disconnection or earthing functions.

These functions can be combined in different ways to achieve functional units performing at the same time current flow, current interruption, disconnection and earthing functions.

A functional unit is thus known composed of a three-position switchgear device respectively performing the switch, disconnecting switch and earthing switch functions, or a functional unit composed of a switch disconnector combined with an earthing switch, or a functional unit composed of a two-position disconnecting switch comprising earthing combined with a switch or a circuit breaker. And a functional unit is also known for example formed by a combination of three devices respectively performing the disconnecting switch, earthing switch and switch functions.

The present invention proposes a medium-voltage electric distribution cubicle enabling the current flow, current interruption, disconnection, and earthing functions to be respectively performed, said cubicle being of simple design while at the same time performing disconnection providing enhanced safety when an operation is performed on the power system.

The invention also procures optimization of the dimensioning of the live components.

BRIEF SUMMARY OF THE INVENTION

For this purpose, the object of the present invention is to provide a medium-voltage electric distribution cubicle of the above-mentioned kind, said cubicle being characterized in that it comprises a switch (or circuit breaker) with vacuum break technology also performing the disconnecting switch function and, in series with said switch (circuit breaker), a selector with at least two positions, respectively a current flow position and an earthing position of the parts of the circuit, said switch (circuit breaker) being electrically connected line-side to a busbar and load-side to the above-mentioned selector, which is electrically connected load-side to at least one cable or to a busbar, said cubicle being able to take three positions, respectively a closed position, a disconnected position and an earthed position.

This therefore enables particular notions of disconnection to be introduced, i.e. on the one hand disconnection of power system operation, and on the other hand disconnection enabling operators to work on an equipment item or its environment, which implies a strong notion of operator safety, guaranteed by double disconnection which adds an additional space.

According to a particular feature, said cubicle comprises means for preventing the selector from leaving the closed position if the switch (circuit breaker) is in the closed position.

According to another feature, said cubicle comprises means for preventing closing of the switch (circuit breaker) if the selector is earthed.

According to another feature, the above-mentioned selector is a three-position selector, respectively a current flow position, an open position, and an earthed position of one of the parts of the circuit.

According to another feature, the above-mentioned selector is a selector using gas-break technology.

According to another feature, the above-mentioned switch (circuit breaker), and/or the above-mentioned selector, is achieved by means of a vacuum cartridge.

According to another feature, the above-mentioned selector comprises a position, called cable test position, enabling the cables to be tested.

According to another feature, the cable test position corresponds to the above-mentioned open position of the selector.

According to another feature, for performing cable testing, the above-mentioned selector comprises a bushing or fixed part of the test connector connected on the cable side, or a bushing or fixed part of the test connector connected on the same side as a stationary contact of the selector situated on the busbar side.

BRIEF DESCRIPTION OF THE DRAWINGS

But other advantages and features of the invention will become more clearly apparent from the following detailed description which refers to the accompanying drawings given for example purposes only and in which:

FIG. 1 represents the cubicle in the closed position, FIG. 2 represents the cubicle in the position called disconnection by the cartridge, FIG. 3 represents the same cubicle in the earthed or grounded position, FIG. 4 represents the same cubicle in the disconnection position with additional insulation, load-side from the cartridge on the cable side, FIGS. 5, 6, and 7 represent the same cubicle in a position called cable test position, according to three possible embodiments of this test.

DETAILED DESCRIPTION

In the figures, a medium-voltage electric distribution cubicle according to the invention has been represented, designed to electrically connect a set of busbars j to a cable c. This cubicle is designed to perform several functions which are respectively to allow current flow between the busbars j and cable c, to perform interruption of the current following a break performed by a switch (circuit breaker) following the occurrence of an electric fault, to perform disconnection of the circuit enabling independent operation of the two parts of the power system, and to perform disconnection of the circuit enabling an operation to be performed on the power system, such as cable testing.

Between the busbar j and cable c, this cubicle comprises a vacuum switch (circuit breaker) 1 connected line-side to the busbar j and load-side to a three-position air selector 2 connected load-side to the cable c.

This vacuum switch (circuit breaker) 1 is achieved by means of a vacuum cartridge 3 and also performs the disconnection function. The selector 2 is a selector using the air-break technology with three positions, respectively an operating position allowing the flow of current, an open position, and an earthed position.

This cubicle also comprises means for preventing the selector from leaving the closed position if the switch (circuit breaker) is in the closed position. These means are necessary in the case where the selector does not have any breaking capacity.

This cubicle also comprises means for preventing closing of the switch (circuit breaker) if the selector is earthed. These means are necessary in the case where tee selector does not have any closing capacity.

Figure 1:
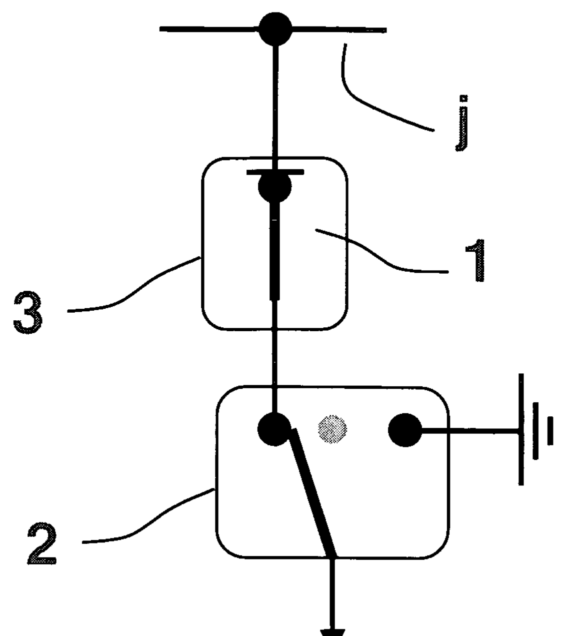
FIGS. 1 to 7 are schematic representations of a distribution cubicle according to the invention in different positions.

In FIG. 1, the current flows between the busbar j and cable c, and the cubicle is in the operating position.

Figure 2:
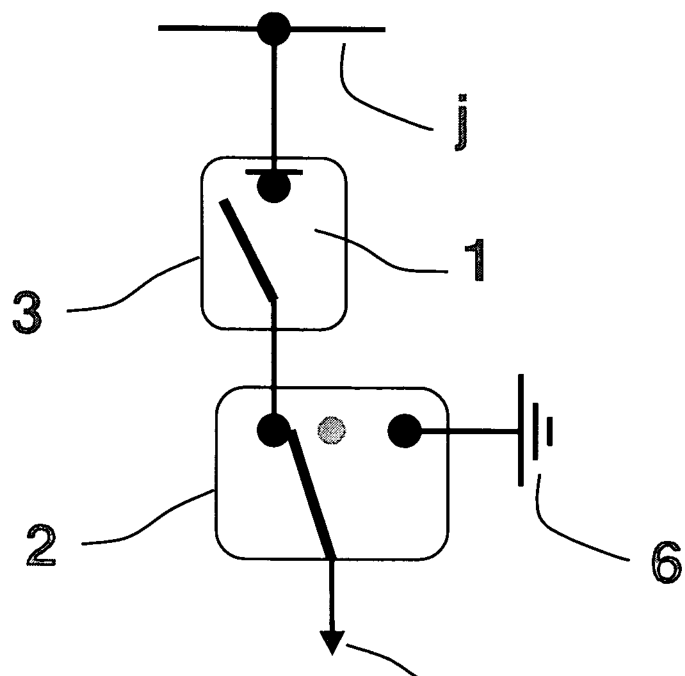

In FIG. 2, the cubicle is in the disconnected position in which the vacuum switch (circuit breaker) is in the disconnection position whereas the selector is in the current flow position. This position enables independent operation of the two parts j and c of the power system.

Figure 3:
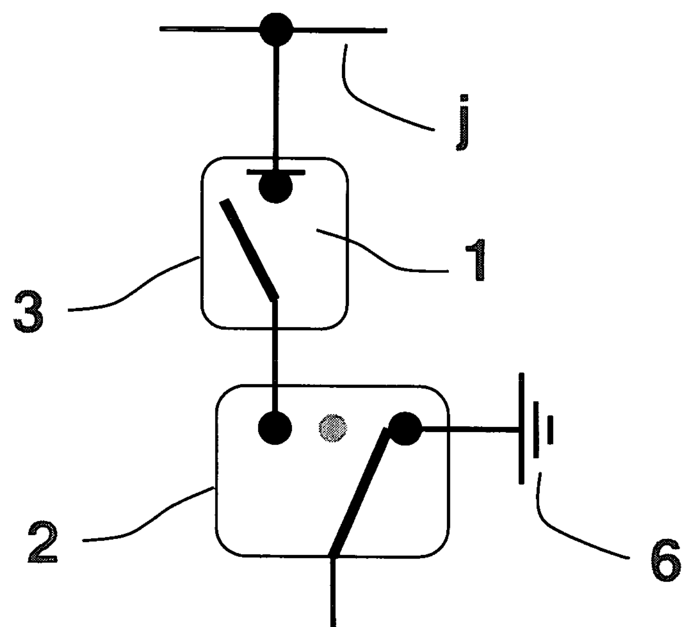

In FIG. 3, the cubicle is in the earthed position 6.

In this position, the vacuum switch (circuit breaker) 1 is in the disconnected position and the air selector 2 is in the earthed position. Opening performed by the air selector adds an insulation gap when earthing is performed, enhancing the safety obtained in this position of the cubicle, and enables operations to be performed on the power system load-side from the air selector.

Figure 4:
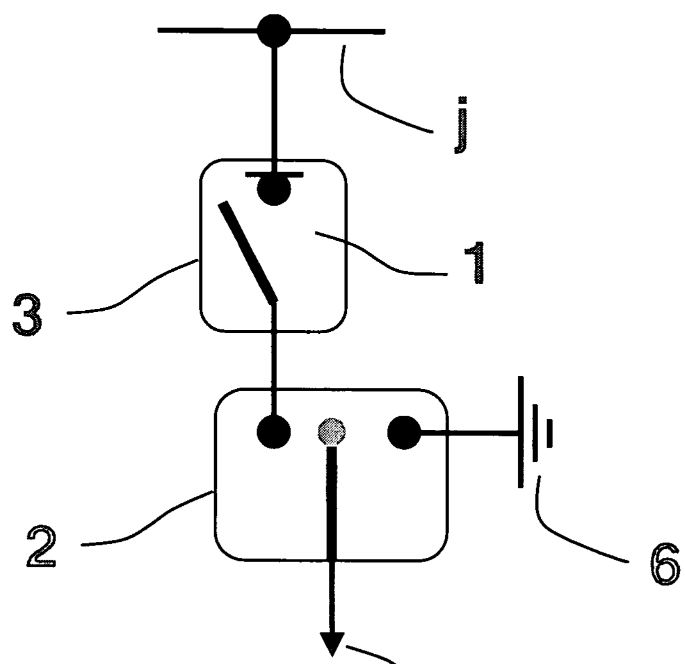

In FIG. 4, the cubicle is in the disconnection position with additional insulation in which the vacuum switch (circuit breaker) and selector are both in a disconnection position.

Figure 5:
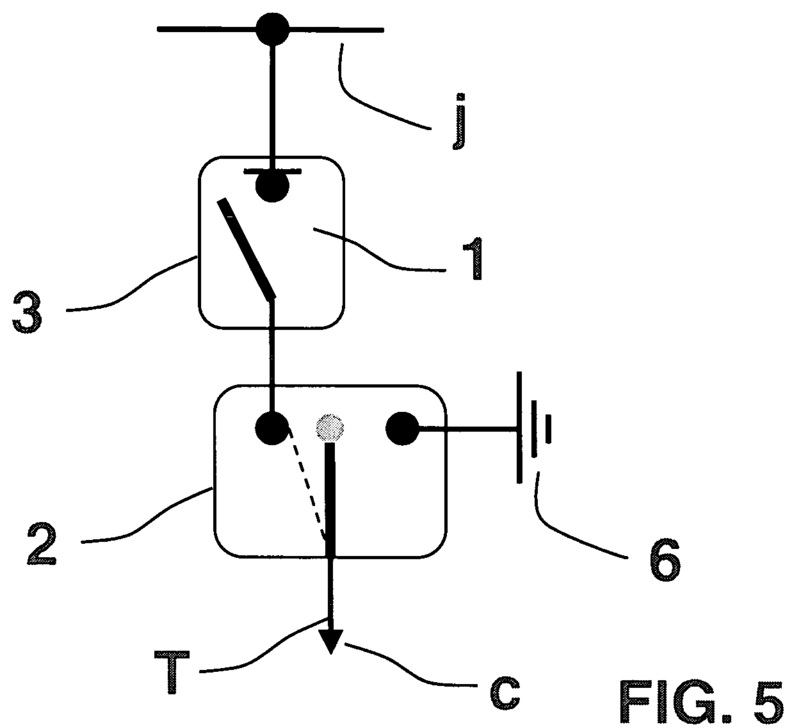
Figure 6:
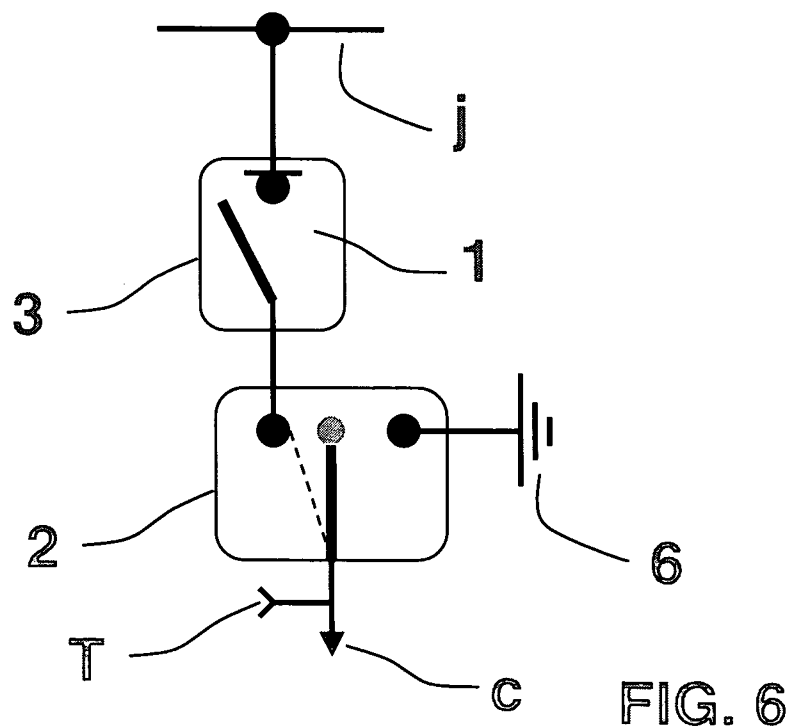
Figure 7:
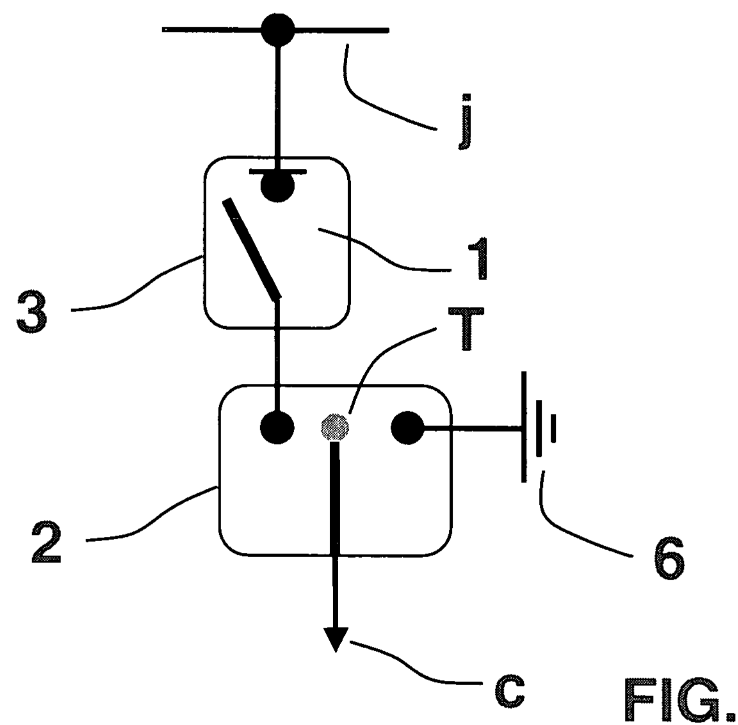

This position of the cubicle also enables operations to be performed on the power system load-side from the selector under enhanced safety conditions, such as an operation consisting in performing cable testing, as illustrated in FIGS. 5 to 7, which test consists in injecting a high voltage on the latter to check its behaviour.

In FIG. 5, in this disconnection position, cable testing T is performed directly at the level of the cable head without using a dedicated bushing.

In FIG. 6, according to another embodiment, this test T is performed by means of a bushing dedicated to testing, arranged on the side where the cable connection bushing is located, connected on the cable side, which cable is permanently live.

In FIG. 7, this test T is performed by means of connectors connected to the selector on the stationary contact side of the selector in this case having three positions.

Figure 8:
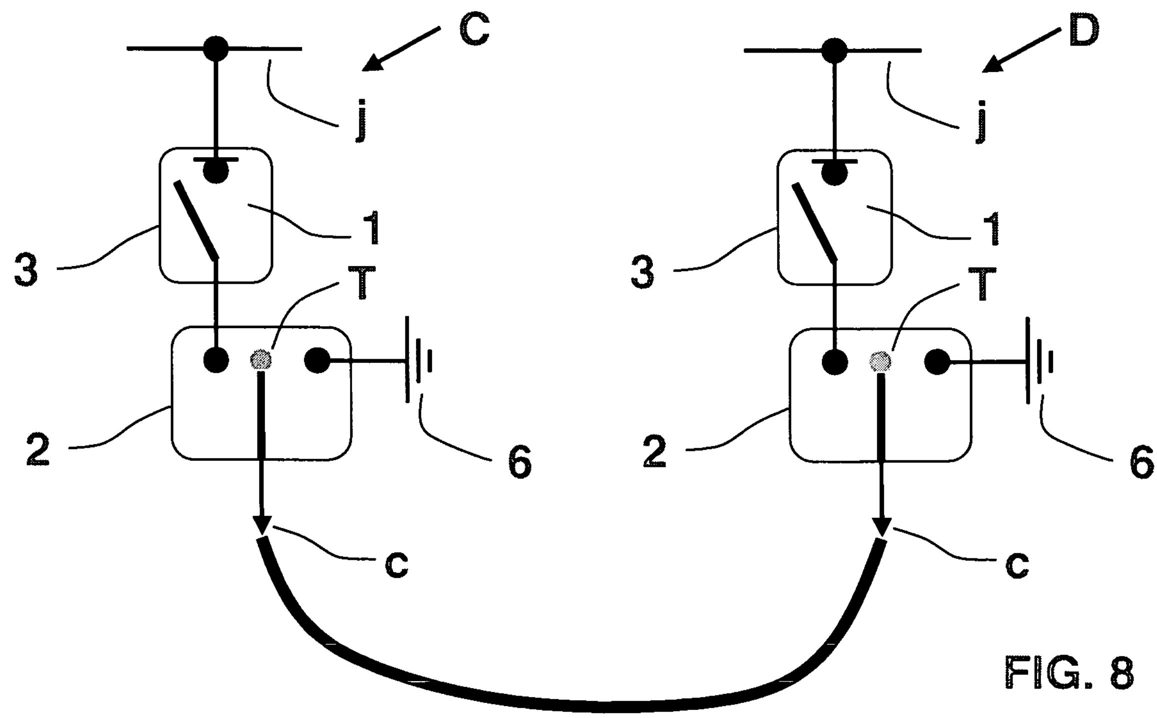
FIG. 8 is a schematic representation illustrating connection of two cubicles when cable testing is performed.

In FIG. 8, two distribution cubicles C,D according to the invention are electrically connected by means of a cable connecting the output terminals of their selectors. This enables the cables to be tested either via the cable heads, or by disconnecting the earthing connection point, or by dedicated bushings on the test point or on the cable side.

Thus, due to this third position of the selector which in particular enables this testing to be performed on the cables, it is no longer useful to provide dielectric dimensioning of the normally earthed outputs, as would have been the case if cable testing was performed by disconnection of the earthing connection point.

A distribution cubicle has thus been achieved according to the invention providing enhanced safety conditions when an operation is performed load-side from the selector, whether the selector has two or three positions.

The invention is therefore characterized by series connection of two disconnection and insulation devices having a disconnection function:

a switch-disconnector or circuit breaker-disconnector with vacuum break technology, simple opening of which performs the disconnection function required for operation of the power system (effective separation of two parts of the power system respecting the requirements specified for disconnectors), and a combined selector-earthing switch which provides a reliable (and possibly visible) insulation gap when the cable feeder is earthed or when the selector is in an additional insulation position, for an operation on the power system, which enhances the safety of operators in case of dielectric overshoot or of malfunctioning of the line-side disconnector cartridge.

By means of the invention, the dimensioning of the live components can be optimized. The disconnection function for operation and the earthing function are separated, which enables the choice of technologies to be optimized for each function (vacuum and air).

The vacuum cartridge is dimensioned for operation (power system voltage, shock voltage). The additional insulation in air is dimensioned for operation on the power system or cable testing, which adds an additional stress (the cable testing voltage), and earthing of the cables.

Another advantage of this scheme lies in the simplicity of operations for the user. The cubicle can be set to three different positions (closed, disconnected, earthed) by means of two devices, but a single device is operated to switch from one state to the other, i.e. from a closed state to a disconnected state, from a disconnected state to earthing, and from earthing to the disconnected state.

The invention is naturally in no way limited to the described and illustrated embodiment which has been given for example purposes only.

The invention thus also covers the solution of a cubicle having a selector which comprises two positions only, respectively a current flow position and an earthed position, for which the results set out in the foregoing are also obtained. The solution of a three-position selector in addition provides advantages inherent to the two-position selector solution, enhanced safety when performing a load-side operation and not having to perform disconnection of the earth when performing cable testing.

Also for example, the vacuum device can be a switch or a circuit breaker, and the selector can use another technology than air, for example vacuum or another gas such as nitrogen, $CO_2$, $SF_6$, etc.

On the contrary, the invention extends to encompass all the technical means of the described means as well as combinations thereof if the latter are performed according to the spirit of the invention.

The invention claimed is:

1. A medium-voltage electric distribution cubicle for connection between two parts of an electric circuit and for performing at least, respectively, current flow between the parts, current interruption between said two parts, circuit disconnection, and grounding of one of said parts, comprising:

a vacuum break circuit breaker-disconnector or vacuum break switch-disconnector, which comprises a vacuum cartridge, a selector switch having at least three positions, namely, an open position for configured for cable testing, a current flow position and a grounding position for one of said parts of an electric circuit, said selector switch connected in series with said vacuum break circuit breaker-disconnector or switch-disconnector for electrical connection/disconnection line-side to a busbar, and load-side to said selector switch, which is for electrical connection load-side to at least one cable, a closed position preventer preventing the selector switch from leaving the closed position if the selector switch is in the closed position, and a closing preventer preventing closing of the selector switch if the selector switch is grounded, whereby said cubicle is capable of being set in any one of three different functional positions in an electric circuit, namely:

a closed position for permitting current flow wherein the vacuum break circuit breaker-disconnector or switch-disconnector and the selector switch are in the closed position;

a disconnected position wherein the vacuum break circuit breaker-disconnector or switch-disconnector is in a disconnection position and the selector switch is in the current flow position, thereby enabling independent operation of two parts of an electric circuit; and a grounded position wherein the vacuum break circuit breaker-disconnector or switch-disconnector is in a disconnection position and the selector switch is in the grounding position thus permitting an operation to be safely performed on the load side of an electric circuit.

2. The electric distribution cubicle according to claim 1, wherein the selector switch is a gas-break selector switch.

3. The electric distribution cubicle according to claim 1 wherein, for performing cable testing, the selector switch comprises a bushing or fixed part of a test connector connected on the cable side, or a bushing or fixed part of a test connector connected to a stationary contact of the selector switch on the busbar side.

4. The electric distribution cubicle according to claim 1, which comprises a vacuum break circuit breaker-disconnector.

5. The electric distribution cubicle according to claim 2 wherein, for performing cable testing, the selector switch comprises a bushing or fixed part of a test connector connected on the cable side, or a bushing or fixed part of a test connector connected to a stationary contact of the selector switch on the busbar side.

* * * * *